United States Patent [19]

Philpott et al.

[11] 4,208,699
[45] Jun. 17, 1980

[54] CAPACITOR WITH MOLDED HEADER INCLUDING STRENGTHENING MATERIAL

[75] Inventors: Conrad L. Philpott, Greenville; Emil F. Blase, Pickens, both of S.C.

[73] Assignee: Sangamo Weston, Inc., Atlanta, Ga.

[21] Appl. No.: 842,739

[22] Filed: Oct. 17, 1977

Related U.S. Application Data

[63] Continuation-in-part of Ser. No. 609,221, Sep. 2, 1975, abandoned.

[51] Int. Cl.² .......................... H01G 9/00; B01J 17/00; B01G 9/16
[52] U.S. Cl. ................................... 361/433; 361/271; 361/272; 174/52 S; 29/570
[58] Field of Search ...................... 361/433, 271, 272; 174/52 S; 29/570

[56] References Cited

U.S. PATENT DOCUMENTS

| 2,758,259 | 8/1956 | Peck | 361/433 |
|---|---|---|---|
| 2,856,570 | 10/1958 | Peck | 361/433 |
| 3,386,014 | 5/1968 | Burger et al. | 361/433 |
| 3,439,234 | 4/1969 | Braiman | 361/433 |
| 3,551,756 | 12/1970 | Frekko | 361/433 |
| 3,681,666 | 8/1972 | Bowling | 361/433 |
| 3,697,824 | 10/1972 | Greskamp | 361/433 |
| 3,866,095 | 2/1975 | Marmorek | 361/433 |
| 4,074,417 | 2/1978 | Pearce et al. | 361/433 |
| 4,101,458 | 7/1978 | Taketani et al. | 361/433 |
| 4,117,579 | 10/1978 | Shaw et al. | 361/433 |

OTHER PUBLICATIONS

Lachowecki, Reinforced Thermoplastics Machine Design; Penton Publishing Co., Cleveland, Ohio; Dec. 1968, pp. 34–38.
Machine Design, Penton Publishing Co., Cleveland, Ohio; Dec. 1968, pp. 41–45.

*Primary Examiner*—Andrew J. James
*Attorney, Agent, or Firm*—Emrich, Root, O'Keeffe & Lee

[57] ABSTRACT

An electrolytic capacitor which may use dimethyl formamide as the electrolyte has a metal housing and a variable thickness molded glass or mineral filled plastic header having a bolster ring adjacent the peripheral edge of the header, major rib members molded on the header which cooperate with further retainer members located at the bottom of the capacitor housing to retain the housing in position, and radial and circumferential members located within said bolster ring on the under side of said header certain of which members are of smaller thickness than the bolster ring, and which further includes areas of relatively thin dimensions located betweeen said circumferential members and said bolster ring, and between said rib members and said circumferential members.

8 Claims, 4 Drawing Figures

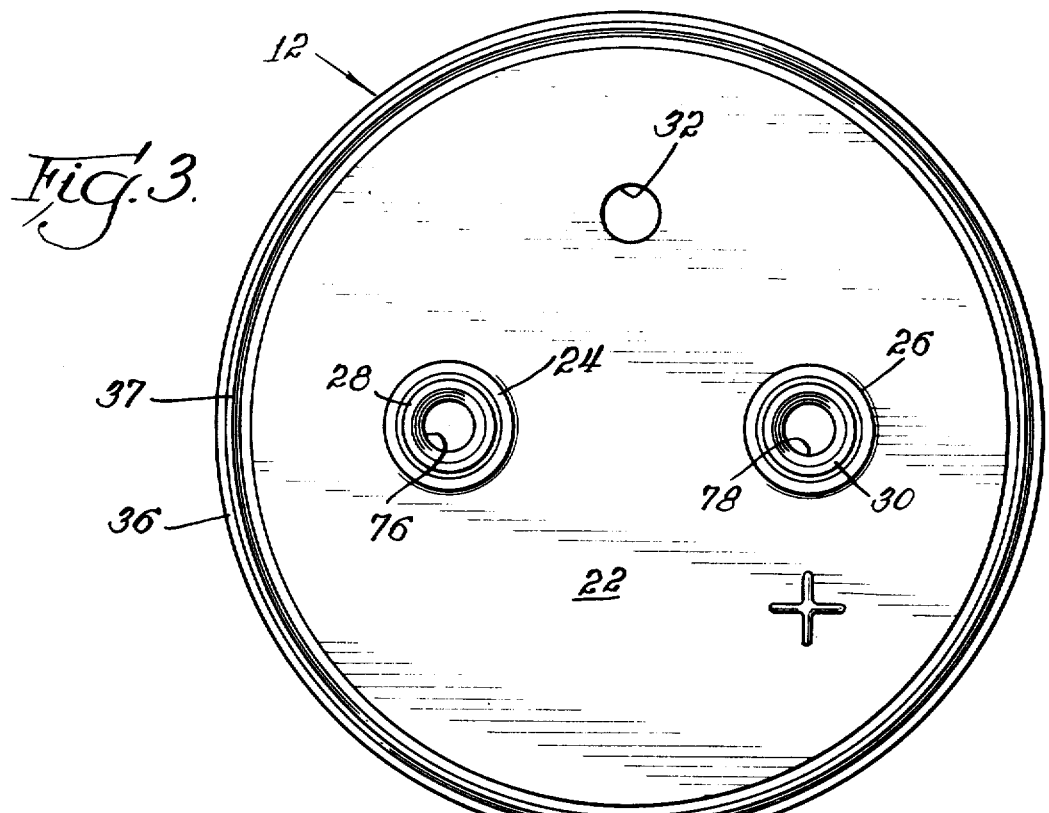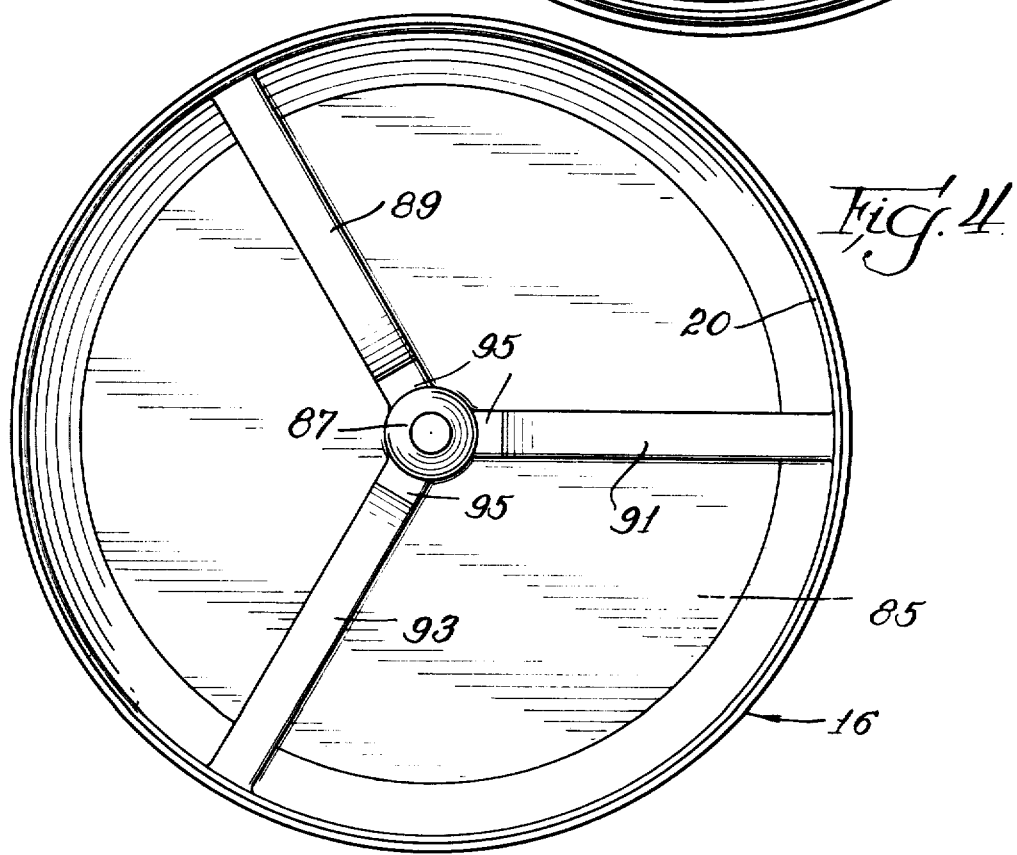

CAPACITOR WITH MOLDED HEADER INCLUDING STRENGTHENING MATERIAL

RELATED APPLICATION

This is a continuation-in-part application of co-pending application Ser. No. 609,221 for CAPACITOR WITH MOLDED HEADER, filed Sept. 2, 1975 and now abandoned.

FIELD OF THE INVENTION

The present invention is directed to a novel electrolytic capacitor, and particularly to an electrolytic capacitor which may be used with all types of currently available capacitor electrolytes, and particularly with electrolytes, such as dimethyl-formamide and the like.

BACKGROUND OF THE INVENTION

Electrolytic capacitors manufactured in the United States have conventionally comprised a capacitor section made up of a series of layers which include a first aluminum foil coated with a layer of aluminum oxide, a paper separator, a second layer of aluminum and a further layer of paper. The layers as assembled are spirally wound to form an elongated cylinder section which is wetted by an electrolyte solution. The elongated section is contained in a housing, normally of aluminum material. A layer of pitch is placed in the housing bottom to protect the capacitor from damage when the capacitor is exposed to shock and vibration forces. The upper end of the capacitor section includes first and second tabs connected respectively to the first and second layers of foil to provide anode and cathode connections. The tabs, in turn, are connected inside the housing to terminals which extend through a header which seals off the open end of the capacitor housing. A rubber gasket is normally inserted between the circumferential edges of the header and the capacitor housing, and after introduction of the section into the housing, the top end of the open housing is then crimped or rolled over to cause the header to be urged into firm contact with a shoulder on the housing to thereby provide a hermetic seal for the housing open end.

In one type of capacitor which has been available in the field for years, the capacitor housing is made of aluminum material, the header is made of phenolic or similar thermosetting material, and the electrolyte is of a glycol type. While such capacitors have performed well over the years, the changing state of the art has resulted in the need and a demand for capacitors of reduced size which are capable of withstanding the same ripple current as capacitors of larger size which use glycol electrolyte.

It is further noted that the conventional capacitor described above is limited in its use to environments in which the temperature is less than 85° C. That is, the glycol type electrolyte which is used in such capacitors requires significant amounts of water, and with the exposure of such capacitors to higher temperatures, the water tends to hydrate the foils, with consequent injury to the capacitor section.

In an attempt to provide a capacitor of smaller size with operating capabilities which are at least the equivalent of the glycol capacitor, the field has turned to the use of new types of electrolytes, one example of which are the electrolytes which basically comprise a dimethyl formamide solution. Such electrolyte, in addition to having increased stability at higher temperatures, also has the capability of imparting properties to the capacitor which enable the capacitor to accept higher AC ripple currents without experiencing a heating problem (in the order of 3:1 as compared to ripple currents which glycol electrolytes can handle). Capacitors which use such electrolyte have been found to have greater long-term stability, and will operate reliably in environments of higher temperature. In addition, since the capacitor with such type electrolyte will work at higher ripple currents for a predetermined ripple current specification, the capacitor having a dimethyl formamide electrolyte may be of a smaller size than the capacitor which uses the glycol type electrolytes.

While dimethyl formamide is known to have these inherent characteristics and advantages, it has been found that the phenolic header and the rubber seals of the conventional capacitors have a short life when a dimethyl formamide electrolyte is used. In one attempt to solve such problem, certain manufacturers have turned to the use of headers made of diallyphthalate (DAP). However, the use of such header material with the dimethyl formamide electrolyte is less than satisfactory because of the tendency of the diallyphthalate material to swell after a period of use at high temperatures and the leakage and sealing problems which result as the swelling occurs.

One successful capacitor which was manufactured by the assignee of the present application uses an aluminum header having a butyl rubber gasket located between the circumferential edges of the header and the container walls. While such header and rubber material will operate successfully in temperature environments up to 105° C., and do withstand the destructive effects of the DMF electrolyte, the capacitor is relatively costly, and it has been necessary to charge a premium price for capacitors of such type. The difference between the cost of an aluminum header and a phenolic header, for example, is significant. Even the smallest saving in the manufacturing cost of a capacitor, as for example, a reduction in the cost of the capacitor header, results in a significant advantage because of the relatively high volume of capacitor production.

At least one manufacturer has provided headers for smaller size capacitors made of unfilled polypropylene material. Such headers were of relatively uniform thickness except for thin projecting circumferential rings on the upper and lower surfaces, and radial rib members which projected inwardly into the housing to assist in restraining the capacitor section against movement. A similar set of ribs was located at the bottom end of the capacitor. While headers made of polypropylene material were apparently satisfactory for smaller size capacitors, headers of relatively uniform thickness made from such material for larger size capacitors (i.e., two inch diameter and larger) did not satisfactorily withstand the pressures experienced with exposure of the capacitor to temperature conditions in excess of 85° C. It is temperatures in excess of 85° C., which cause the greatest difficulty.

It is an object of the present invention, therefore, to provide a novel capacitor which uses an electrolyte, such as DMF, to provide operating characteristics which are equal to or better than the conventional capacitor which uses glycol type electrolyte, which is of a lower cost than the premium type capacitor presently available on the market, and which in both smaller and larger sizes will satisfactorily withstand the pressures which occur when the capacitor is subjected to temperatures of 85° C.

As noted above, the conventional electrolytic capacitors use pitch material in the bottom of the container to minimize the possible damage to the capacitor section and/or tabs when the capacitor is used in environments of severe shock and vibration. While such material has performed satisfactorily, the use of the pitch material adds a significant cost to the manufacturing operation. That is, it is necessary (a) to provide dust-free storage locations for the pitch, (or dust will settle on and stick to the pitch and appear as a contaminant in the finished product), (b) to provide machines for heating the pitch and introducing the pitch into the capacitor housing, and (c) to provide storage room for periods in the order of twenty-four hours for the capacitors as filled with pitch to cool down for room temperature testing. The use of pitch or other potting compound is a disadvantage that it occupies space that might otherwise be used to reduce the rate of pressure build-up within the capacitor during use. For example, pitch may take up to one-third or one-half of the available space.

It is a specific object of the invention to provide a capacitor in smaller and larger sizes which uses electrolytes, such as DMF, which is capable of passing shock and vibration tests established in the field without using pitch or other potting compound as a retainer mechanism, and further which may be manufactured at a significant reduction in the cost of manufacture for the previous type capacitors, and which performs satisfactorily in temperature environments in excess of 85° C.

SUMMARY OF THE INVENTION

According to the invention, a capacitor of improved operating characteristics is provided at reduced cost which includes a cylindrical aluminum casing having a closed end and an open end, a capacitor section located within such casing, and a header for the closed end molded from a fiberglass reinforced or mineral filled plastic compound.

In a preferred embodiment the header includes a bolster ring on the underside of the header which extends adjacent the outer peripheral edge thereof whereby significant movement of flow of the header material is prevented when the capacitor is subjected to temperatures of 85° C. A plurality of radial compression ribs extend inwardly to a central hub or arbor, and depend downwardly into the casing for contact with the capacitor section. The central hub or arbor projects downwardly below the compression ribs into the approximate center of the capacitor section to retain the section against movement when subjected to shock and vibration forces. Compression ribs and a central arbor are also provided in the bottom of the capacitor housing to assist in restraint of the capacitor section against movement. The bottom compression ribs and arbor may be extruded from the bottom of the aluminum can or alternatively, may comprise a plastic member, similar to the header member which is force fit into the bottom of the housing.

The header member may also include metal terminals located in bosses which are formed in the header, circumferential members which extend between the bosses, minor radial ribs which are extensions of the radial compression ribs, rigid lugs may extend from the bolster ring to the bosses, and minimum thickness areas located between the circumferential members and the rib members, and between the circumferential members and the bolster ring.

In one preferred embodiment which provided reliable operation and life when used in temperature environments of 85° C., the plastic material comprised fiberglass reinforced propylene terpolymer injection molding compound. In embodiments in which the capacitor is subjected to significantly higher temperatures, the plastic material may comprise glass-reinforced polyphenelene sulfide compound or a reinforced nylon 6/6.

BRIEF DESCRIPTION OF THE DRAWINGS

FIG. 3 is a top view of such header; and

FIG. 4 is a top view of the bottom of the capacitor casing.

GENERAL DESCRIPTION

Figure 1:
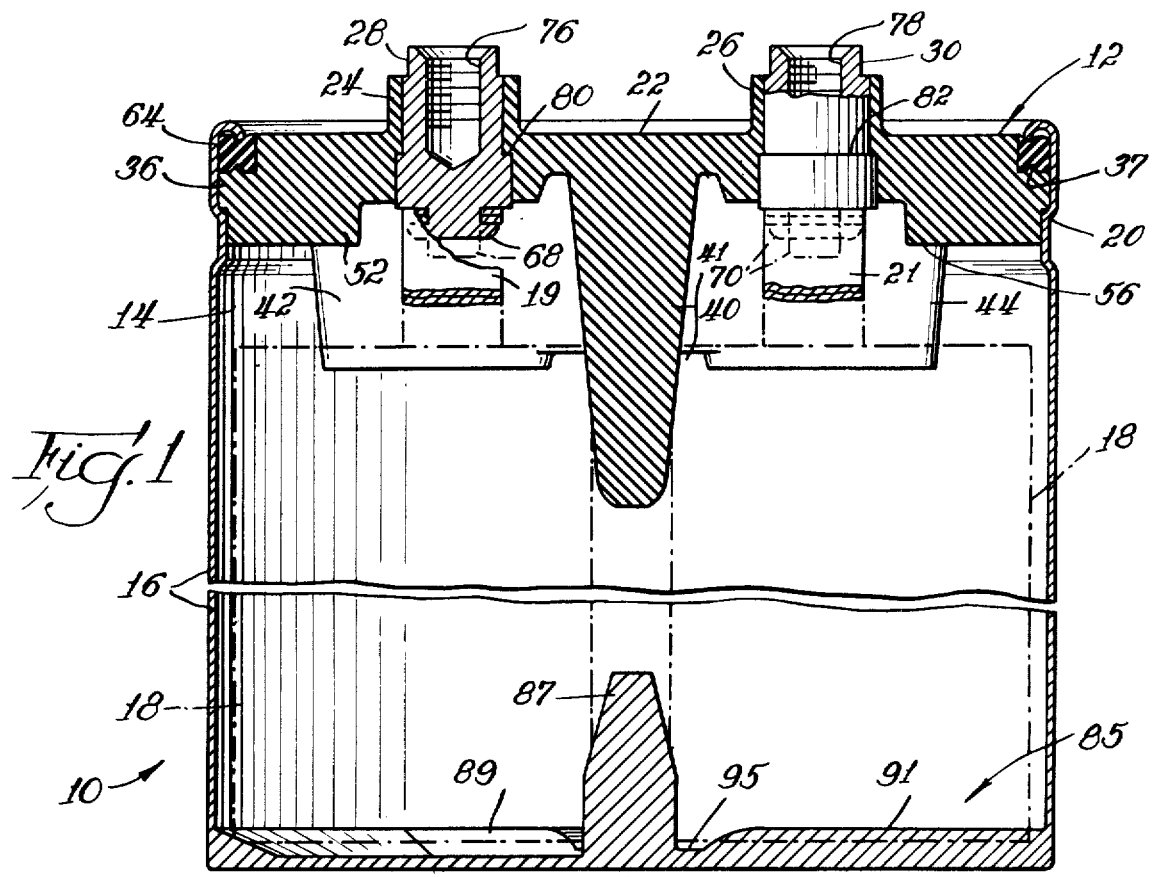
FIG. 1 is a transverse sectional view of the novel capacitor including the novel header and extruded ribs and arbor at the bottom end of the capacitor.

With reference to FIG. 1 there is disclosed an electrolytic capacitor generally indicated by reference numeral 10. A novel capacitor header 12 made in accordance with the present invention, is disposed inwardly of the open section 14 of the generally cylindrical capacitor casing or housing 16 which serves to store the capacitor section 18. The capacitor casing 16 locates an annular shoulder 20 which is formed adjacent the open end section 14 of the housing. As will be shown, during assembly the shoulder 20 provides a support and reaction surface for the header member 12.

The capacitor section 18 includes a first (or anode) foil made of oxidized aluminum, a second layer of paper, a third layer (or cathode foil) of oxidized aluminum and a fourth layer of paper, all of which are spirally wound to form the elongated cylindrical capacitor section 18 as shown in FIG. 1. Flexible tabs 19 and 21 extend outwardly from the upper end of the capacitor section.

The open end 14 of the capacitor housing 16, as shown in FIGS. 1 and 3, is closed off by a circularly shaped molded header member 12 which is made from a fiberglass reinforced plastic injection compound. Header member 12 has a substantially flat outer or top surface 22 (FIG. 3) which locates integrally molded cylindrical bosses 24 and 26, each of which has a metal terminal 28, 30, respectively, molded therein. A conventional vent plug 32 is also located in the header member 12. The outer circumference of the header member 12 locates an annular lip 36 having a seal projection 37 (FIGS. 1 and 3) which extends around the periphery of the header member 12 on the lip 36. The diameter of the lip 36 is approximately the same size as the interior diameter of the capacitor casing 12. A relatively wide bolster ring 34 extends along the under outer circumferential edge of the header member 12 adjacent to and inwardly of the annular lip 36. The inner edge of bolster ring 34 tapers inwardly and upwardly at an angle of approximately 30° to the thinner areas, such as 39, (FIG. 2) of the header member 12.

Figure 2:
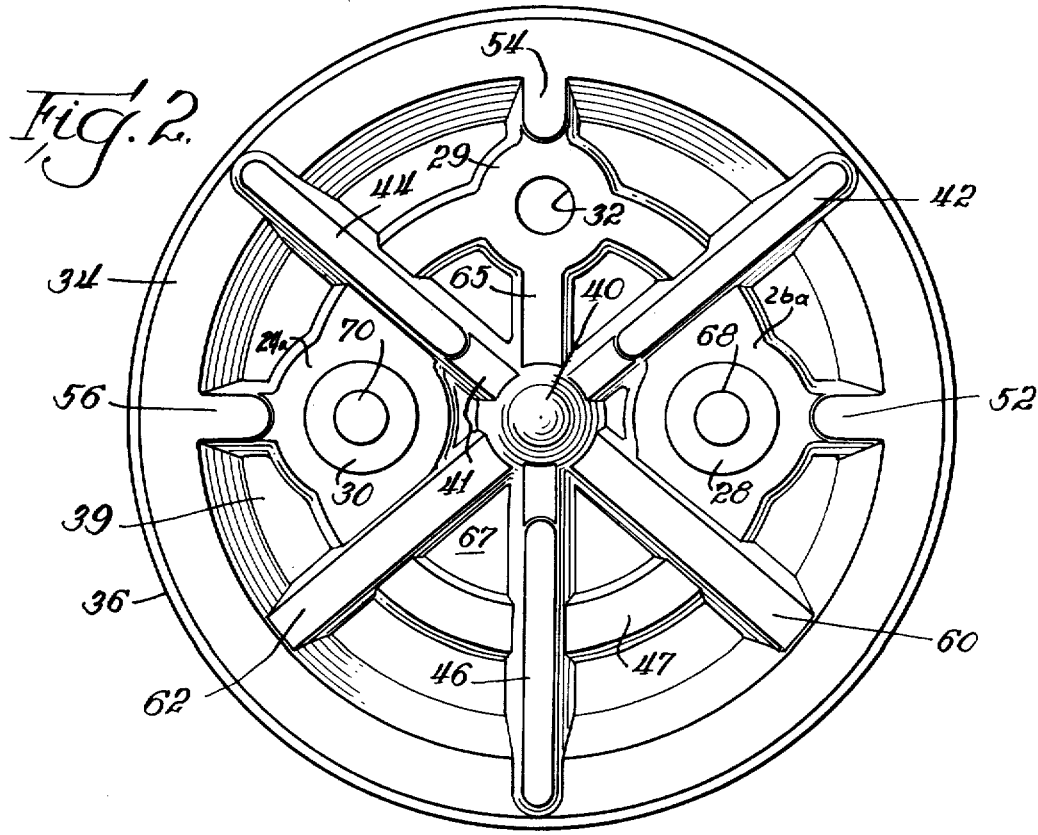
FIG. 2 is a bottom view of the integrally molded header which is used to seal the open end of the capacitor casing.

A central hub or arbor member 40 located on the inner or under side of the integrally molded header member 12 projects downwardly into the housing for, and into contact with, the center portion of capacitor section 18 when the header is assembled with the casing 12. Three compression rib members 42, 44, 46, as best shown in FIG. 2, extend radially outward from the hub 40 to the outer peripheral edge of the bolster ring 34. Two of the compression ribs 42, 44 are spaced from one another by 100°, and each is spaced from the third compression rib 46 by approximately 130°. Terminals 28, 30 are located along a diameter which extends through the center of the header member 12.

Header member 12 in the illustrated embodiment also includes circular members 47 which lie along a circumferential line which extends through the center of terminals 28, 30 and vent 32. First and second lugs 52, 56 extend radially inward from the bolster ring to the inner ends 24a, 26a of bosses 24, 26 for terminals 28, 30. A third lug 54 extends radially inward from the bolster ring 34 to a boss 29 which is provided on the under side only of header 12 for vent 32. Two additional minor ribs 60, 62 are located on opposite sides of hub 40 as extensions of ribs 42, 44, to the inner edge of bolster ring 34. Partial rib 65 extends between the arbor 40 and boss 29 for vent 32. A relief groove 41 is located at the point of juncture of the ribs 42, 44, 46 with the arbor 40 to protect against the possibility of shorting of the anode and cathode elements by the ribs 42, 44, 46 when the assembled section is placed under pressure.

The areas, such as 67, of the header which lie between the circumferential members 47 and the radial ribs, such as 42, 65, etc., have a thinner dimension which is in the order of the dimension of areas 39.

An annular gasket member 64 of butyl-N rubber having a durometer of 65-70 is placed on shoulder 36 during assembly of the capacitor as will be described, and as thus mounted extends peripherally around the header member to cooperate with the lip 37 in providing a seal for the capacitor housing.

The lower ends 68, 70 respectively (FIG. 1) of the metal terminal members 28, 30 which are molded in the cylindrical bosses 24, 26 on the header 12 project downwardly into the capacitor housing for connection to the flexible anode and cathode tabs 19, 21 respectively on the capacitor section 18. Central recesses 76, 78 on the outer ends of the terminals 28, 30 are threaded to receive fastener screws (not shown) for use in connecting the terminals 28, 30 to other electrical equipment. The cylindrical bosses 24 and 26 extend around terminals 28, 30 both above the upper header surface 22 and below the depressed area 39 to provide increased holding forces for the metal terminal members, the lower or inner ends 24a and 26a of the bosses being of greater diameter than the upper or outer end. Shoulders 80, 82 on terminals 28, 30 assist in fixedly positioning the terminals 28, 30 within the molded header 12.

Retainer means 85 located at the bottom of the capacitor housing further retain the capacitor section 18 against movement. In one embodiment such means may be extruded from the bottom surface of the casing 16. Alternatively, the retaining means may be molded from plastic material and force fit into the bottom of the housing 16.

As shown in FIGS. 1 and 4, the upper surface of retainer 85 is shown to comprise a projecting hub or arbor 87, and three radial compression ribs 89, 91, 93, the ribs being located at approximately 120° relative to one another.

In one embodiment of a 3" capacitor the anode and the cathode foils are substantially the same width and the paper separator extends outwardly approximately ¼" beyond the foil.

In one embodiment of the invention as used in a capacitor having a 3" diameter housing, the section 18 was in the order of 4⅞" in length and the shoulder 20 was approximately 5.344" above the bottom of the casing. The dimension of the ribs from the under side of the lip 36 of the header 12 was 0.520 inch. The dimension from the top of the bottom ribs 89 to the shoulder 20 was 5.199". With the elements of the capacitor thus dimensioned when the capacitor is assembled, pressure is exerted on the capacitor section resulted in approximately 5/64" compression of each one of the paper separator margins of the capacitor section by engagement with the compression ribs 42, 44, 46 and 89, 91, 93 to form corresponding creases or ridges in the separator. A pressure was exerted several times the amount of pressure that can be obtained simply by turning the top of the can over; and with this pressure applied, the upper edge of the can is crimped or rolled over. The creases in the margin of the separator take a permanent set and have been found to provide holding power to prevent rotation or lateral movement of the capacitor section in the final assembly.

The header 12 in such embodiment has a diameter of approximately 3" and the thinnest portions such as 39 of such header were approximately 1/8" thick whereby the ratio of the thickness of areas 39 to the edge thickness of the header was in the order of 1 to 4. Compression ribs 42, 44, 46 had bases of ribs which were in the order of 3/16" in width and extended inwardly approximately 2 1/32" from the depressed area. The vertical sides of the ribs tapered inwardly approximately five degrees to a thickness of approximately ⅛" to terminate at the upper ends in fillets having 1/64" radius. Hub 40 has a base diameter of 0.45" and extends upwardly at a taper of 5° to a reduced diameter of 0.260". The outer end of hub 40 has a fillet radius of ⅛".

The bottom surface of bolster ring 34 was approximately 0.187" wide and tapered inwardly approximately 30° to the depressed area and outwardly at an angle of 5° to the bottom of lip 36. The width of the inner surface of bolster ring relative to the header radius was thus in the order of 1 to 8. Lip 36 protruded from bolster ring 34 approximately 0.050" and was approximately ⅛" thick. Lugs 52, 54, 56 were 5/32" wide, ⅛" high and ¼" long and terminated in a radius of 5/64".

Circular rib sections 47 were 5/32" wide, and were ⅛" thick. The inner ends 24a, 26a of the bosses 24, 26 and boss 29 which are joined by the circular rib 47 are the approximate height (⅛") of the ribs 47 and approximately ⅝" in diameter. The outer end of the bosses 24, 26 extended 3/16" above the header 12 and were 0.437" in diameter. The diameter of the inner end of the metal terminals was approximately ⅝" and the upper end portion of the metal terminal located within the outer ends of the bosses 24, 26 was approximately 0.350" in diameter. The minor radial ribs 60, 62 had a thickness of 3/16", and a width of 5/32" wide and ⅛" thick.

The ribs 89, 91, 93 had a height of approximately 9/64" measured from the outside bottom of the housing 16, a width of approximately 3/16" and a fillet radius along the upper edge of approximately 1/64". Hub 87 extended approximately ½ inch above the top of ribs 89, 91, and 93. The top surface of the hub had a diameter of ⅛", which tapered inwardly to a thicker diameter of approximately 0.325". The inner ends of the ribs of the hub 87 are grooved as shown at 95 to a depth of approximately 1/16" to prevent possible shorting of the anode and cathode elements of the capacitor section when the capacitor is assembled under pressure.

In assembly of the capacitor, a vent plug 32 is inserted in the vent hole in known manner and the tabs 19 and 21 on the capacitor section 18 are fastened by staking or welding, or the like to the inwardly projecting ends 68, 70 of the terminals 28, 30 on the header member 12, and the gasket member 64 is placed on shoulder 36 of the header.

The header member 12 is then moved into engagement with the upper end of the capacitor section, the end portion of the hub member 40 being urged into the central area of the upper end of the capacitor section 18, and the outer fillet surfaces of the rib members 42, 44, 46 being urges against the upper surface of the capacitor section 18.

The capacitor section 18 is then introduced into the capacitor casing 16 to bring the central area of the lower end of section 18 into registration with the locater hub member 87, and areas of the lower end of capacitor section 18 into registration with the upper fillet edges of compression ribs 89, 91, 93. Such assembly is then placed in a press which urges the header member 12 into capacitor housing 16 until the lower peripheral edge of the lip 36 on the header is brought into engagement with shoulder 20 on the housing 16. At this point the fillet edges of the upper and lower ribs have depressed the respective ends of the capacitor section approximately 0.080" to form the previously mentioned creases in the margins of the capacitor section.

With the pressure applied, the edge of the housing 16 is then rolled over in a conventional manner to maintain pressure on the gasket and the header member 12 to thereby cause the upper compression ribs 42, 44, 46 and lower compression ribs 89, 91 and 93 to maintain the capacitor section 18 between the upper and lower rib members by fitting into the creases in the capacitor section. The rolling of the upper edge of housing 16 into engagement with the gasket 64 also urges gasket 64 into contact with seal projection 37 on lip 36 to form a hermetic seal for the capacitor.

In one successful embodiment the fiberglass reinforced plastic molding compound comprises Profil J-60/40/E which is a material commercially available from Fiberfil Division, Dart Industries Inc., Evansville, Ind. Such material may be propylene-ethylene-acrylic acid terpolymer comprised of approximately 90% propylene, 6% ethylene and 4% acrylic acid reinforced with intermediate fiberglass in the order of 40%. Other glass reinforced polypropylene materials commercially available for use in the novel header for capacitor applications in temperature environments of 85° C. include Profil J60/20/E which is of the same basic composition and includes 20% intermediate fiberglass, Profil J60/30/E which has 30% intermediate fiberglass, Dexon 563 glass reinforced material which is available from the Exxon Corporation, Houston, Tex. A material marketed under the name Ryton, a polyphenelene sulfide which is available from Phillips Chemical Co., of Houston, Tex., has also proved successful for operation temperatures in excess of 85° C. Ryton R4 is a glass-filled (approximately 40%) polyphenelene sulfide material, and R8 has a more economical mineral filling. Both have proved successful.

A further compound suitable for such use when reinforced with fiberglass in such manner includes a nylon 6/6 compound which is commercially available under the tradename Zytel 70-G-33-HSI L, from DuPont Chemical Co. of Wilmington, Del.

It was further found that with a capacitor 2" or smaller in diameter, it was possible to use a molded header of fiberglass reinforced plastic compounds which had a uniform thickness configuration and the resistance to material flow provided by the fiberglass reinforced plastic compound even in the uniform thickness configuration was such as to provide reliable use in the field when subjected to the temperature environments of 85° C.

As noted above, the novel header molded from fiberglass (glass) filled and mineral filled plastic molding compound permits the use of electrolytes, such as dimethyl formamide, in the capacitor to thereby make possible the provision of a capacitor in small and large sizes having improved ripple current parameters, which may be successfully used in temperature environments in excess of 85° C. without experiencing material flow and leakage.

A particular feature of the novel structure is the manner in which the same capacitor header with compression ribs along with a retainer with compression ribs at the bottom of the casing crease the marginal edges of the capacitor section to firmly hold it to withstand the shock and vibration tests which have been established in the field for capacitor units. As noted above, such arrangement eliminates the conventional pitch material and results in a significant reduction in the manufacturing costs.

In a further embodiment, the capacitor section 18 is wound to provide a so-called extended cathode configuration wherein the cathode foil extends approximately ⅛" beyond the end of the paper separator. As such type section is inserted into the housing, the cathode foil at the bottom of the section is urged into firm contact with the metal rib members located at the bottom of the capacitor whereby heat generated in the capacitor section finds a path over the ribs to the can bottom and can exterior. Test of a capacitor of the three inch size having such construction showed an increase in ripple current capability of approximately 12%, and heat transfer increase of 85° C. in the order of 25%.

We claim:

1. An electrolytic capacitor comprising a casing having a closed bottom end and an open upper end; a capacitor section located within said casing having anode foils and cathode foils; porous separators for said foils; an electrolyte impregnating said foils including dimethyl formamide solvent; a header sealed to the open end of said casing and comprising molded plastic material characterized as being dimensionally stable and resistant to chemical attack by said dimethyl formamide at temperatures in excess of 85° C.; and including strengthening material selected from the group consisting of glass fibers and minerals; conductive retainer means at the bottom of said casing adapted to conduct heat from one of said foils to said casing; said header being formed to define further retainer means including a plurality of ribs extending radially of said header and depending downwardly therefrom into engagement with the upper end of the capacitor section, and a bolster ring extending about the lower surface of said header and integral with the distal ends of said ribs, said further retainer means inducing a force on said capacitor section to urge said capacitor section in pressure contact with said first retainer means, said first retainer means and said further retainer means cooperating to fix said capacitor section against horizontal, vertical and rotational movement.

2. An electrolytic capacitor as set forth in claim 1 in which said header material is selected from the group consisting of propylene-ethylene acrylic acid and nylon 6/6 compound and includes reinforcing glass fibers.

3. An electrolytic capacitor as set forth in claim 2 in which said header comprises 20%–40% glass fiber, and includes an additive for enhancing the bonding of said glass fiber to said moldable material.

4. An electrolytic capacitor as set forth in claim 1 in which said first retainer means includes radially extending compression ribs, and said separator extends beyond both marginal edges of said anode and cathode foils and is permanently creased on each marginal edge by said ribs of said header and said compression ribs of said first retainer means to firmly hold said capacitor section in place.

5. An electrolytic capacitor as set forth in claim 4 in which said casing is of a metal material, and said first retainer means comprises radial members extruded as an integral portion of the bottom of said metal capacitor casing.

6. An electrolytic capacitor as set forth in claim 1 in which said header includes a lip member which extends around the outer circumference of the header to locate a gasket member for use in sealing said capacitor.

7. The capacitor of claim 1 wherein said header material comprises polyphenelene sulfide.

8. An electrolytic capacitor as set forth in claim 1 in which said first retainer means includes radial rib members and a central arbor which extends into a central aperture located at the lower end of said capacitor section, and in which said header also includes a molded central arbor extending into a central aperture located at the upper end of said capacitor section.

* * * * *